Figures 1, 3:
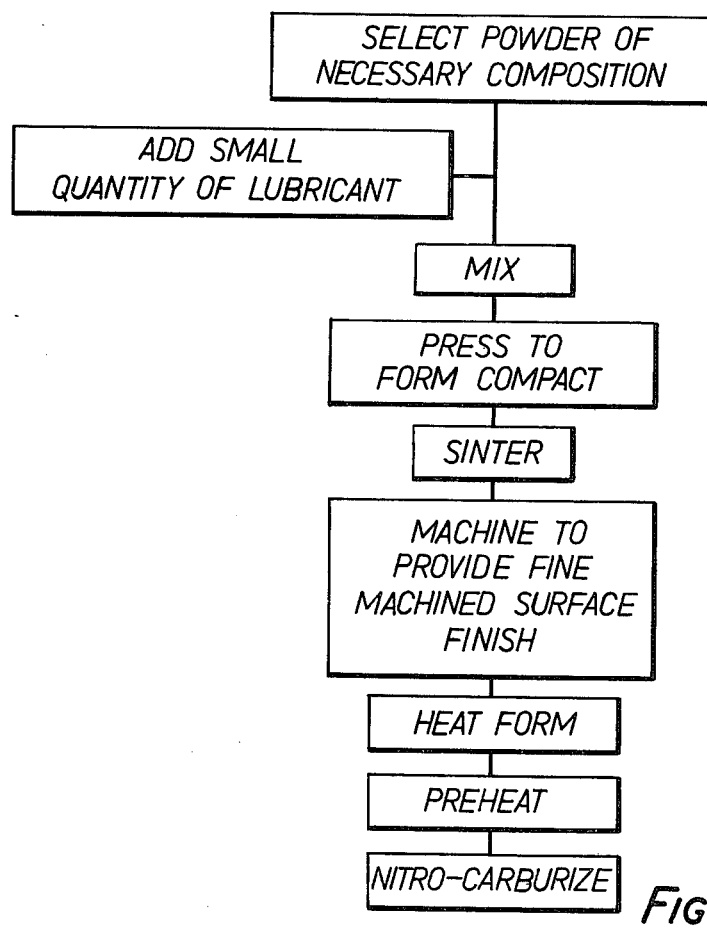

United States Patent [19]

Warner et al.

[11] 4,271,239
[45] Jun. 2, 1981

[54] SINTERED METAL ARTICLES AND PROCESS FOR THEIR MANUFACTURE

[75] Inventors: Percival E. Warner, Coventry; Paul Smith, Birmingham; Terence M. Cadle, Coventry, all of England

[73] Assignee: Brico Engineering Limited, Coventry, Great Britain

[21] Appl. No.: 926,037

[22] Filed: Jul. 19, 1978

[30] Foreign Application Priority Data

Jul. 20, 1977 [GB] United Kingdom ............... 30360/77

[51] Int. Cl.³ ............................................. B22F 3/24
[52] U.S. Cl. ..................... 428/547; 148/126; 148/15.5; 75/200; 75/238
[58] Field of Search ................. 148/126, 15.5; 75/200, 75/238; 428/547

[56] References Cited

U.S. PATENT DOCUMENTS

| 3,194,696 | 7/1965 | Müller | 148/15.5 |
| 3,829,295 | 8/1974 | Farmer | 75/238 |
| 3,880,600 | 4/1975 | Zboril | 75/238 |
| 3,912,547 | 10/1975 | Gaucher et al. | 148/15.5 |

Primary Examiner—Brooks H. Hunt
Attorney, Agent, or Firm—Mawhinney & Mawhinney & Connors

[57] ABSTRACT

A sintered metal article such as a piston ring or a sealing ring (in particular those having a cross-section area not exceeding 20 mm²) having a density which is at least 88.5% of the theoretical density, having a fine machined surface finish, and having a nitrocarburized surface layer which is not found at a depth of more than about 250 microns from the surface.

The invention also includes the process of manufacturing such an article.

11 Claims, 3 Drawing Figures

SINTERED METAL ARTICLES AND PROCESS FOR THEIR MANUFACTURE

This invention relates to sintered metal articles and to processes for their manufacture, and relates particularly but not exclusively to piston rings and sealing rings which have a relatively small cross-section i.e. having a cross-section area not exceeding 20 mm², especially to piston rings for car engines, to piston rings for small engines such as those used in lawn mowers and chain saws, and to shock absorber sealing rings.

According to this invention in one aspect, a sintered metal article has a density which is at least 88.5% of the theoretical density, has a fine machined surface finish (as hereinafter defined), and has a nitrocarburised surface layer ("white layer") which is not found at a depth exceeding about 250 microns from the surface of the article.

Preferably the density is at least 90% of the theoretical density.

According to this invention in another aspect, a process for the manufacture of a sintered metal article includes the steps of pressing metal powder to a density of at least 88.5% of the theoretical density to form a compact, sintering the compact, fine machining the surface of the sintered article, and nitrocarburising the machined article to provide a hardened surface layer ("white layer") at a depth from the surface of the article which does not exceed about 250 microns.

Preferably the metal powder is pressed to a density of at least 90% of the theoretical density.

Figure 2:
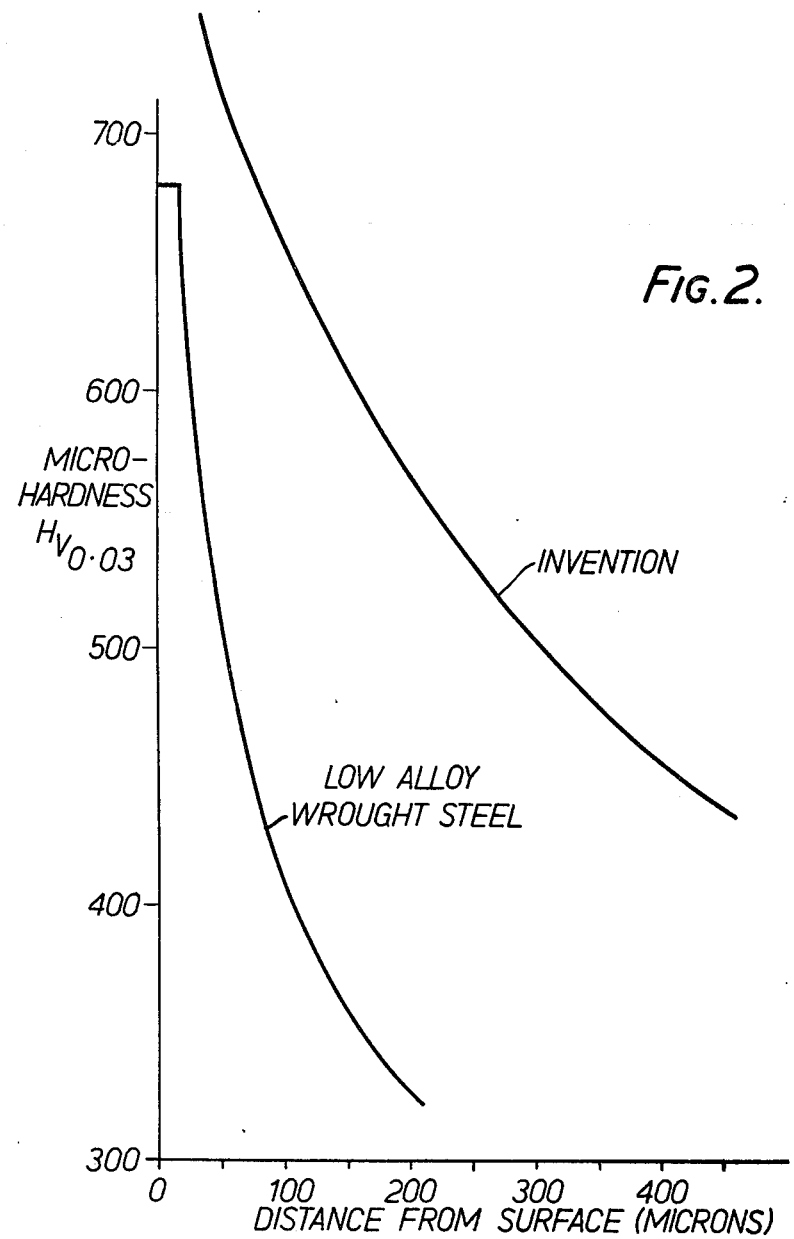

A method of manufacture of piston rings and sealing rings in accordance with the invention will now be described by way of example, with reference to the accompanying drawings, of which:

FIG. 1 is a diagram showing a surface layer,
FIG. 2 is a graph of hardness against distance from the surface, and
FIG. 3 is a flow chart of the process.

A powder of less than 100 B.S. mesh size and of one of the following compositions is selected (all percentages in the specification being percentages by weight):

| % age Comp. | A | B | C | D | E | F |
|---|---|---|---|---|---|---|
| Total C | 0.3–0.9 | 1.5 | 0.3 | 0.9 | 0.6 | 2 |
| Cu | 2–5 | 4 | — | 6 | 3 | 5 |
| Mo | 0.4–0.6 | 0.6 | — | — | 0.5 | 1.2 |
| Ni | 1.5–2.0 | — | — | — | 4.5 | — |
| Mn,Si,S, & P (total) | ≯2 | ≯2 | ≯2 | ≯2 | ≯2 | ≯2 |
| Fe | rem | rem | rem | rem | rem | rem |

A small percentage, e.g. 1%, of a suitable lubricant such as Zinc Stearate may also be added. The powder is thoroughly mixed in a suitable mixer, and is then pressed in a suitable powder metallurgy press to the desired form.

In contrast to previous practice, in which the powder was pressed to a density of 6.7 gm/cc, or approximately 85% of theoretical density, in accordance with the present invention the powder is pressed to a minimum density of at least 7.0 gm/cc, and preferably to a density of 7.1–7.2 gm/cc. A density of 7.0 gm/cc for these compositions corresponds to 88.5% of the theoretical density, and a density of 7.1 gm/cc corresponds to approximately 90% theoretical density.

The pressed compact is then sintered in a protective atmosphere, for example of dissociated ammonia, at at temperature in the range 1090° C–1120° C, for between 20 and 40 minutes. The lubricant disappears during the sintering process.

After sintering, the rings are machined in accordance with normal practice, including cutting the gap, the final machining operation being fine turning. "Fine machining" is defined for the purpose of this specification as turning with at least 360 cuts per inch. Preferably the depth of the grooves left by turning on the surface of the rings is approximately 7.5 microns. The average cross-section area of piston rings for car engines is 5–10 mm².

The rings are then stacked on their side faces with a weight on top, the gaps being aligned and filled by a gap piece to maintain the gap at the correct width, and are heat formed in accordance with normal practice, and allowed to cool. The stack of rings is then preheated to at least 350° C., and preferably 400° C., and is then immersed in a nitrocarburising salt bath containing sodium and potassium salts, the cyanide level (as KCN) being maintained at 45–50% and the cyanate level (as KCNO) at 40–50%. The bath was maintained at a temperature of 570° C. The stack of rings was immersed for 45 minutes.

With rings made of known powder metallurgy materials, such as that described in our British Pat. No. 979,414, the depth of penetration of the nitrocarburised layer ("white layer") is about 1.5 mm from the surface, due to the porosity of the material. With rings made in accordance with the invention, the depth measured from the surface at which the nitrocarburised layer ("white layer") can be found does not exceed about 250 microns.

The following table shows the tensile strength and elasticity of rings made of the two materials:

| Material | Density gm/cc | Elasticity number (E) GN/m² | Tensile strength (MN/m²) Before Treatment | After Treatment |
|---|---|---|---|---|
| As B.P. 979,414 Example | 6.7–6.8 | 117 | 495 | 315 |
| A | 7.1–7.2 | 131–138 | 725 | 650 |

The properties of rings made of compositions B, C, D, E and F are very similar.

The treatment referred to in columns 4 and 5 of the table is the nitrocarburising salt bath treatment.

FIG. 1 is a diagram showing a typical surface layer of a ring in accordance with the invention, highly magnified; the depth of the pores seen does not exceed about 250 microns from the surface and thickness of the "white layer" caused by nitrocarburising is about 250 microns. Thus the "white layer" is not found at a depth exceeding about 250 microns from the surface. It will be seen that closing of the neck of the pores does not occur, so that the material has good lubricant retention properties.

FIG. 2 is a graph of Vickers micro-hardness HV0.03 plotted against distance from the ring surface for two materials, the upper trace being measured on the materials of example A according to the invention, and the lower trace being measured on a nitrocarburised low alloy wrought steel. It will be seen that for the latter there is a surface layer having a hardness of 680, but only about 12 microns thick, after which the hardness falls away rapidly so that at a depth of about 200 microns the hardness is only 325; with the material according to the invention the fall-off in hardness is more gradual, being over 550 at a depth of 200 microns, due to the effect of the nitrocarburising "white layer" within the pores for up to about 250 microns from the surface. The "white layer" in this case consists of carbides and epsilon iron nitride, and it will be appreciated that the effect of nitrogen diffusion extends beyond the "white layer" for about 250 microns.

With the material according to the invention, embrittlement due to an excessively thick "white layer" does not occur.

The wear, with the fine-turned surface finish described above, has been measured as 17 microns over a 200 hour test, which was superior to that of chrome-plated cast iron under the same conditions.

Two other forms of nitrocarburising salt bath may be used. One is similar to that described above, but has the cyanide maintained at a low level (about 2%) which is to be preferred on the grounds of health and safety.

In the other, the cyanate level is 30–40%, and the bath also contains 0.1–0.5% sulphur, the balance being potassium, sodium and lithium carbonates. This salt bath may also be used at a temperature of 570° C. Although the latter process may not strictly be described as nitrocarburising, it has no other name known to applicants, and is therefore referred to as, and included within the term nitrocarburising for convenience.

Thus, the materials of the invention may be summarised as having the following properties which are desirable in piston rings and sealing rings which have a relatively small cross-section, i.e. those having a cross-section area not exceeding 20 mm², especially piston rings for car engines, for small engines such as those used in lawn mowers, and shock absorber sealing rings:

(a) good elasticity, to maintain pressure against cylinder wall;
(b) good lubricant retention properties;
(c) good tensile strength, leading to good fatigue life;
(d) wear resistance equal to or better than that of chrome-plated cast iron.

We claim:

1. An iron-based sintered metal article for use in products requiring wear resistance and good tensile strength and which has been pressed so that after compacting it has a density which is at least 88.5% of the theoretical density, has a fine machined surface finish comprising turning with at least 360 cuts per inch, and has a nitrocarburized surface or white layer which is not found at a depth exceeding about 250 microns from the surface of the article.

2. An article as claimed in claim 1 wherein said density is at least 90% of the theoretical density.

3. An article according to claim 1 which has the following composition (in percentage by weight):—total carbon 0.3–0.9%; copper 2–5%; molybdenum 0.4–0.6%; nickel 1.5–2.0%; manganese, silicon, sulphur, phosphorous not exceeding 2% in total; the remainder being iron.

4. An article according to claim 1 wherein the depth of the grooves left by turning on the surface of the articles is approximately 7.5 microns.

5. An article according to claim 1 wherein the nitrocarburized layer includes carbides and epsilon iron nitride.

6. An article according to claim 1 in the shape of a piston ring or sealing ring.

7. A process for the manufacture of an iron-based sintered metal article for use in products requiring wear-resistance and good tensile strength, comprising:

(a) pressing an iron-based metal powder to a density of at least 88.5% of the theoretical density to form a compact;
(b) sintering the compact;
(c) fine machining the surface of the sintered article, comprising turning with at least 360 cuts per inch; and
(d) nitrocarburizing the machined article to provide a hardened surface or white layer on said surface at a depth from the surface of the article which does not exceed about 250 microns.

8. A process as claimed in claim 7, in which the metal powder is pressed to a density of at least 90% of the theoretical density.

9. A process as claimed in claim 7, wherein the metal powder has the composition;—total carbon 0.3–2%; copper 0–6%; molybdenum 0–1.2%; nickel 0–4.5%; manganese, silicon, sulphur, phosphorous not exceeding 2% in total; iron the remainder, and including the step of pressing the metal powder to a density of at least 7.0 gm/cc.

10. A process as claimed in claim 7, including the step of immersing the machined article in a nitrocarburizing salt bath containing sodium and potassium salts, the cyanide level being maintained at 45–50% and the cyanide level being maintained at 40–50%.

11. A process as claimed in claim 7 wherein the depths of the grooves left by turning on the surface of the articles is approximately 7.5 microns.

* * * * *